(12) United States Patent
Lin et al.

(10) Patent No.: US 11,796,840 B2
(45) Date of Patent: Oct. 24, 2023

(54) ELECTRICALLY CONTROLLED POLARIZATION ROTATOR

(71) Applicant: NATIONAL SUN YAT-SEN UNIVERSITY, Kaohsiung (TW)

(72) Inventors: Tsung-Hsien Lin, Kaohsiung (TW); Heng-Yi Tseng, Kaohsiung (TW); Cheng-Chang Li, Kaohsiung (TW); Duan-Yi Guo, Kaohsiung (TW); Li-Min Chang, Kaohsiung (TW); Kuan-Wu Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 172 days.

(21) Appl. No.: 17/485,549

(22) Filed: Sep. 27, 2021

(65) Prior Publication Data
US 2023/0031864 A1    Feb. 2, 2023

(30) Foreign Application Priority Data

Jul. 28, 2021    (TW) .................................. 110127723

(51) Int. Cl.
*G02F 1/01*    (2006.01)
*G02F 1/1337*    (2006.01)

(52) U.S. Cl.
CPC ...... *G02F 1/0136* (2013.01); *G02F 1/133738* (2021.01); *G02F 1/133742* (2021.01); *G02F 2202/06* (2013.01)

(58) Field of Classification Search
None
See application file for complete search history.

(56) References Cited

U.S. PATENT DOCUMENTS

| | | | | |
|---|---|---|---|---|
| 2002/0160126 A1* | 10/2002 | Toko | ..................... | G02F 1/1393 428/1.1 |
| 2017/0269453 A1* | 9/2017 | Galstian | ................... | G02F 1/29 |

* cited by examiner

*Primary Examiner* — Phu Vu
(74) *Attorney, Agent, or Firm* — WPAT, P.C

(57) ABSTRACT

An electrically controlled polarization rotator is disclosed. The electrically controlled polarization rotator includes two substrates and a liquid crystal layer located between the two substrates. The two substrates have a homogeneous alignment and a homeotropic alignment respectively. A distance between the two substrates is a liquid crystal thickness. A switching electric field which is adjustable is provided between the two substrates. A polarized light is incident on the substrate having the homogeneous alignment. A polarization direction of the polarized light is orthogonal or parallel to an alignment direction of the substrate having the homogeneous alignment. A birefringence of the liquid crystal layer multiplied by the liquid crystal thickness and further divided by a wavelength of the polarized light is greater than 10. The polarization direction of the polarized light is rotated corresponding to an intensity of the switching electric field in the liquid crystal layer.

8 Claims, 5 Drawing Sheets

ELECTRICALLY CONTROLLED POLARIZATION ROTATOR

CROSS REFERENCE TO RELATED APPLICATION

The application claims the benefit of Taiwan application serial No. 110127723, filed on Jul. 28, 2021, and the entire contents of which are incorporated herein by reference.

BACKGROUND OF THE INVENTION

1. Field of the Invention

The present invention generally relates to an optical-electric component and, more particularly, to an electrically controlled polarization rotator with small volume and no dispersion phenomenon for broad spectrum light.

2. Description of the Related Art

The polarization type and polarization direction of light can be changed by guiding the light to penetrate through special polarization media, such as polarizer, analyzer, waveplate, etc. The characteristics of polarized light can be utilized to adjust the optical properties such as light transmittance and reflectance, in an optical system. The polarization direction of linearly polarized light can be continuously switched by utilizing conventional polarization rotators. The conventional polarization rotators are not merely used for switching control of household appliances such as display panels, smart glass, and lighting devices, but also used in advanced technologies such as integrated optical circuits and optical communications as miniaturized polarization rotators.

The above-mentioned conventional polarization rotator is only suitable for light of a specific wavelength. When light of different wavelengths enters the conventional polarization rotator, there would be different polarized modulation effects, resulting in the dispersion phenomenon of broad-spectrum polarized light after polarization rotation. Further, there are oscillating changes in the transmittance or absorptivity of subsequent optical elements after light penetrating, which would reduce the quality of image tone or light signal transmission. In addition, another conventional polarization rotator can perform polarization switching of broad spectrum light by rotating the polarizer through a mechanical shaft. However, the conventional polarization rotator is difficult to be miniaturized due to its volume limit and cannot be used for precision optical systems such as integrated optical circuits.

In light of the above problem, it is necessary to improve the conventional polarization rotator.

SUMMARY OF THE INVENTION

It is therefore an objective of this invention to provide an electrically controlled polarization rotator for broad spectrum light without occurring dispersion phenomenon.

It is another objective of this invention to provide an electrically controlled polarization rotator which can be miniaturized.

It is yet another objective of this invention to provide an electrically controlled polarization rotator which can improve the quality and utilization of optical signals.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

In an aspect of the present invention, an electrically controlled polarization rotator includes two substrates and a liquid crystal layer located between the two substrates. The two substrates have a homogeneous alignment and a homeotropic alignment respectively. A distance between the two substrates is a liquid crystal thickness. A switching electric field which is adjustable is provided between the two substrates. A polarized light is incident on the substrate having the homogeneous alignment. A polarization direction of the polarized light is orthogonal or parallel to an alignment direction of the substrate having the homogeneous alignment. A birefringence of the liquid crystal layer multiplied by the liquid crystal thickness and further divided by a wavelength of the polarized light is greater than 10. The polarization direction of the polarized light is rotated corresponding to an intensity of the switching electric field in the liquid crystal layer.

Accordingly, the electrically controlled polarization rotator of the present invention utilizes an alignment force and the switching electric field applied to the liquid crystal layer, so as to rotate the polarization direction of the polarized light corresponding to the change of the intensity of the switching electric field, instead of utilizing volume-consuming mechanical control. In addition, selection of the thickness and chiral force of the liquid crystal layer can achieve approximate polarization rotation effects for light of given wide wavelength range, ensuring the effects of miniaturization, avoiding chromatic dispersion, and improving optical effective utilization.

In an example, an angle between two alignment directions of the two substrates is a rotation angle, and the rotation angle is greater than 0 degrees and less than or equal to 90 degrees. A ratio of the liquid crystal thickness to a pitch of the liquid crystal layer is less than or equal to ¼. The polarization direction of the polarized light is rotated between 0 degrees to the rotation angle. Thus, the polarization direction of the polarized light can be rotated within ranges of right or any acute angle, ensuring the effect of selecting the range of the polarization rotation angle.

In an example, materials of the liquid crystal layer are negative liquid crystals doped with chiral molecules. As the switching electric field increases from 0 to a saturated electric field, the polarization direction of the polarized light is rotated from 0 degrees to the rotation angle. Thus, the polarization rotator does not perform polarization rotation when the switching electric field is not provided, and the polarization rotation angle increases with the intensity of the switching electric field, ensuring the effect of electrically controlled polarization rotation.

In an example, materials of the liquid crystal layer are positive liquid crystals doped with chiral molecules. As the switching electric field increases from 0 to a saturated electric field, the polarization direction of the polarized light is rotated from the rotation angle to 0 degrees. Thus, the polarization rotator does not perform polarization rotation when the saturated electric field is provided. The polarization rotation angle increases as the intensity of the switching electric field decreases. The polarization rotator appears the maximum polarization rotation angle as the switching electric field is not provided, ensuring the effect of polarization rotation without power consumption.

In an example, an angle between two alignment directions of the two substrates is a rotation angle. The rotation angle is greater than 90 degrees and less than or equal to 180 degrees. A ratio of the liquid crystal thickness to a pitch of the liquid crystal layer is greater than ¼ and less than or equal to ¾. Thus, the polarization direction of the polarized light can be rotated to any angle within a range of 180 degrees, ensuring the effect of selecting the range of the polarization rotation angle.

In an example, materials of the liquid crystal layer are negative liquid crystals doped with chiral molecules. As the switching electric field increases from 0 to a saturated electric field, the polarization direction of the polarized light is rotated from half of the rotation angle to the rotation angle. Thus, the polarization rotator appears the minimum polarization rotation angle when the switching electric field is not provided, and the polarization rotation angle increases with the intensity of the switching electric field, ensuring the effect of electrically controlled polarization rotation.

In an example, materials of the liquid crystal layer are positive liquid crystals doped with chiral molecules. As the switching electric field increases from 0 to a saturated electric field, the polarization direction of the polarized light is rotated from half of the rotation angle to 0 degrees. Thus, the polarization rotator does not perform polarization rotation when the saturated electric field is provided. The polarization rotation angle increases as the intensity of the switching electric field decreases. The polarization rotator appears the maximum polarization rotation angle as the switching electric field is not provided, ensuring the effect of polarization rotation without power consumption.

In an example, materials of the liquid crystal layer are dual-frequency liquid crystals doped with chiral molecules. A frequency of the switching electric field switches between a low frequency and a high frequency. The low frequency is less than a crossover frequency of the liquid crystal layer, and the high frequency is greater than the crossover frequency of the liquid crystal layer. As the switching electric field switches to the low frequency and increases from 0 to a saturated electric field, the polarization direction of the polarized light is rotated from half of the rotation angle to 0 degrees. As the switching electric field switches to the high frequency and increases from 0 to the saturated electric field, the polarization direction of the polarized light is rotated from half of the rotation angle to the rotation angle. Thus, switching the frequency and intensity of the switching electric field can make the polarization direction of the polarized light rotate clockwise or counterclockwise, ensuring the effect of selecting the direction of polarization rotation.

In an example, each of the two substrates has a conductive layer. An adjustable power supply is electrically connected to the two conductive layers. A material of the two conductive layers is indium tin oxide, nano silver wire or nano metal particle. Thus, the two conductive layers can provide an electric field of adjustable intensity between the two substrates, ensuring the effect of electrically controlling the twisted amplitude of liquid crystal molecules.

In an example, a material of the two substrates is glass, acrylic or plastic. Thus, the two substrates can restrict fluid movement, ensuring the effect of controlling the range and thickness of the liquid crystal layer.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
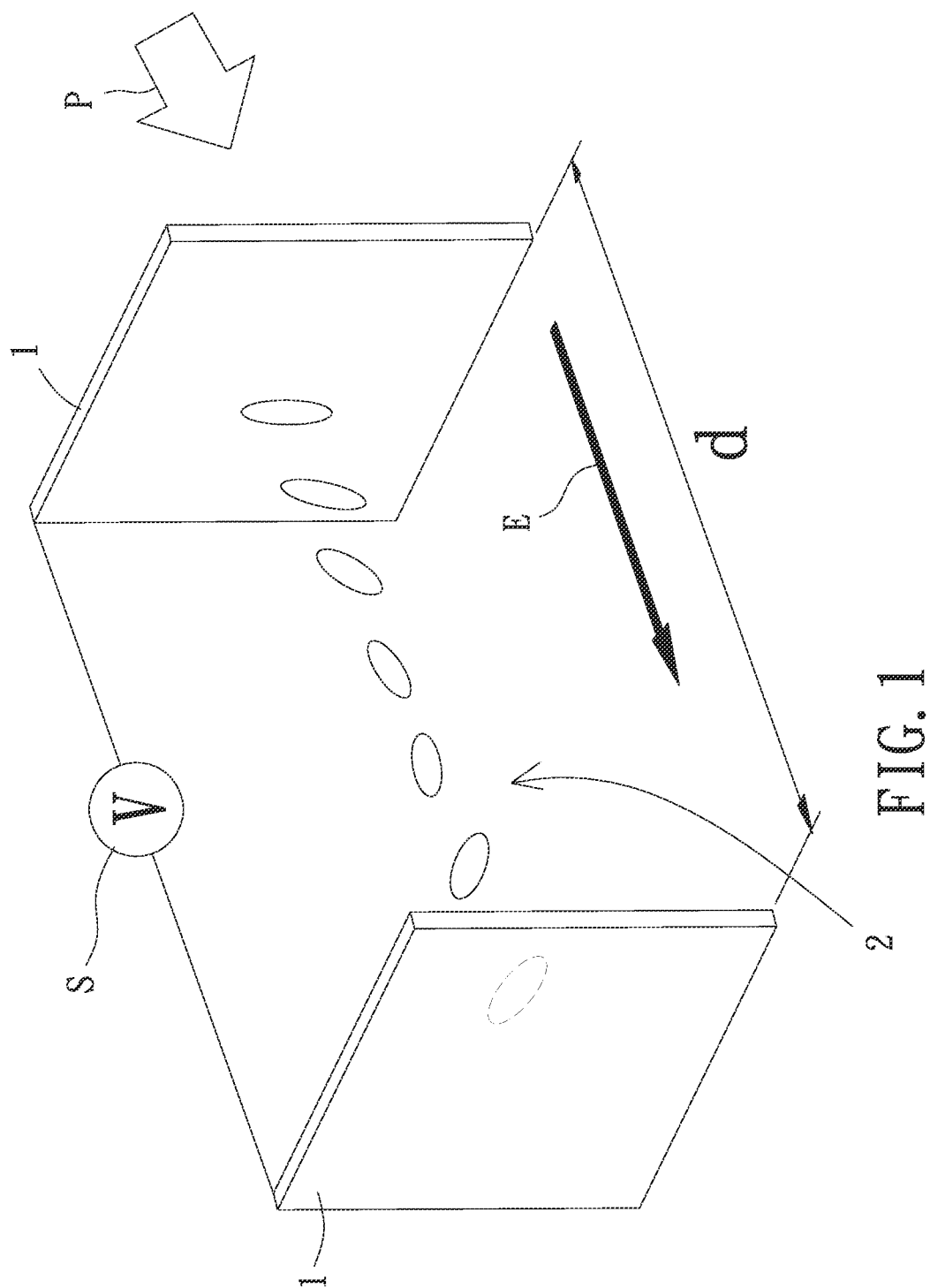
FIG. 1 is a perspective view in a preferred embodiment of the invention.

In the various figures of the drawings, the same numerals designate the same or similar parts. Furthermore, when the terms "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 shows an electrically controlled polarization rotator according to a preferred embodiment of the invention. The electrically controlled polarization rotator includes two substrates 1 and a liquid crystal layer 2. The liquid crystal layer 2 are located between the two substrates 1. A polarized light P is incident on one of the substrates 1, performing polarization switching in the liquid crystal layer 2, and be emitted from the other substrate 1.

The distance between the two substrates 1 is a liquid crystal thickness d. The two substrates 1 have a homogeneous alignment and a homeotropic alignment respectively. The polarized light P is incident on the substrate 1 having the homogeneous alignment, and the linear polarization direction of the polarized light P is preferably orthogonal or parallel to the alignment direction of the substrate 1. Each of the two substrates 1 can have a conductive layer, and an adjustable power supply S is electrically connected to the two conductive layers. When the adjustable power supply S gradually increases the supplied voltage, the two conductive layers can provide a gradually increased switching electric field E between the two substrates 1, and the magnitude of the switching electric field E is inversely proportional to the liquid crystal thickness d. The two substrates 1 may be transparent hermetic materials, such as glass, acrylic or plastic (PET, PC and PI), etc., used to confine the fluid substance between the two substrates 1. The two conductive layers may be transparent conductive materials, such as indium tin oxide (ITO), nano silver wire, or nano metal particles, etc.

The materials of the liquid crystal layer 2 include nematic liquid crystals and chiral molecules. The specification requirement of the liquid crystal layer 2 is: $\Delta n \cdot d / \lambda > 10$, where $\Delta n$ is the birefringence of liquid crystal layer 2 on which the polarized light P is incident; d is the thickness of the liquid crystal layer 2, i.e., the distance between the two substrates 1; and $\lambda$ is the wavelength of the polarized light P. When the liquid crystal layer 2 meets the above specification requirement, the polarization rotation angle error of the polarized light P in the polarization switching can be limited within 3 degrees, so that the dispersion phenomenon of the polarized light P in the polarization switching is not obvious and is difficult to be observed.

Figure 2:
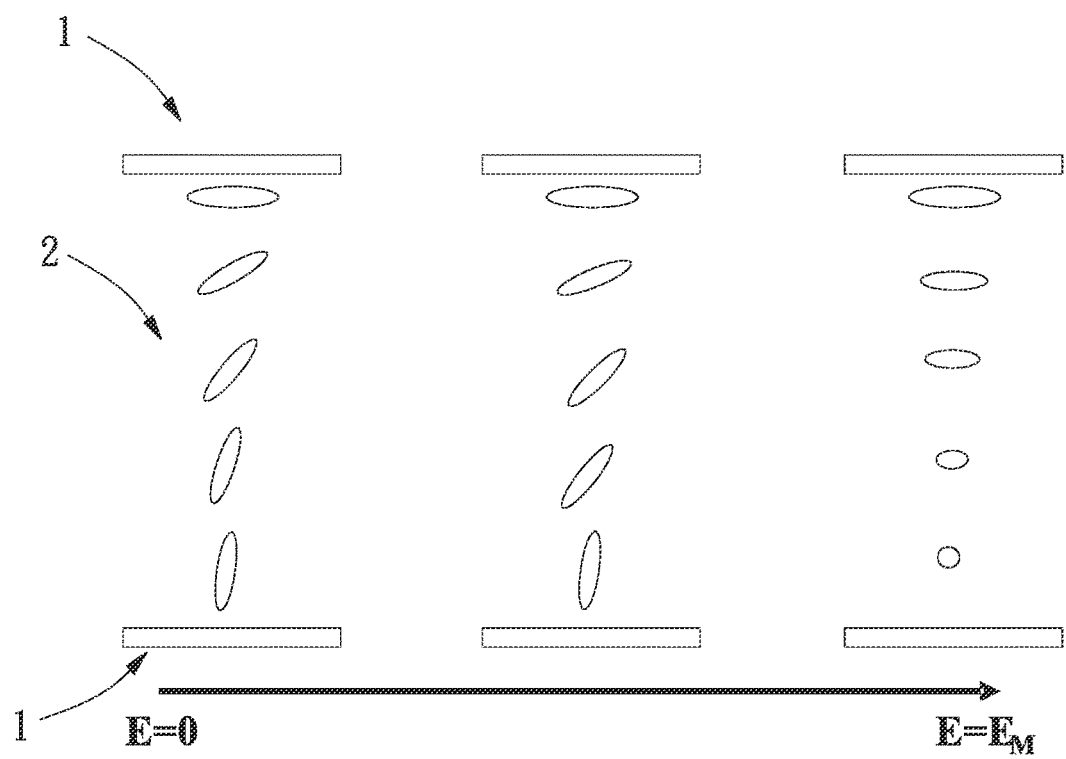
FIG. 2 is a schematic view of negative liquid crystal molecules with voltage applied in a preferred embodiment of the invention.

Referring to FIGS. 1 and 2, which show the schematic views of the electrically controlled polarization rotator of the embodiment with the switching electric field E applied to change the arrangement of liquid crystals. The switching electric field E gradually increases from 0 to a saturated electric field $E_M$. The angle between two alignment directions of the two substrates 1 is a rotation angle $\theta$, which is greater than 0 degrees and less than or equal to 90 degrees. The ratio of the liquid crystal thickness d to the pitch of the liquid crystal layer 2 is less than or equal to ¼. The rotation angle $\theta$ is the angle range that the polarized light P can rotate. In this embodiment, the materials of the liquid crystal layer 2 include negative liquid crystals doped with chiral molecules. When the switching electric field E is 0, the arrangement of liquid crystals is based on the alignments of the two substrates 1, so that the liquid crystal molecules arranged between the two substrates 1 gradually rotate from being aligned with planes parallel to the two substrates 1 to being aligned with planes vertical to the two substrates 1, and are only slightly twisted on the planes parallel to the two substrates 1. At this time, the polarized light P passes through the liquid crystal layer 2, but the polarization direction of the polarized light P is unchanged. When the switching electric field E gradually increases, the liquid crystal molecules begin to be aligned along a vertical direction of the switching electric field E. The liquid crystal molecules originally aligned with the planes vertical to the two substrates 1 gradually rotate to be aligned with the planes parallel to the two substrates 1, and are twisted on the planes parallel to the two substrates 1 between the two substrates 1 to become a twisted nematic liquid crystal. The stronger the switching electric field E, the larger the twist angle. At this time, the polarization direction of the polarized light P rotates toward the twisting direction of the liquid crystal, and the rotation angle of the polarization direction of the polarized light P changes according to the intensity of the switching electric field E. When the switching electric field E increase to reach the saturated electric field $E_M$, the liquid crystal molecules are completely aligned along a vertical direction of the switching electric field E and all turn to be aligned with the planes parallel to the two substrates 1. Also, the liquid crystal molecules are twisted by the rotation angle $\theta$ into a twisted nematic liquid crystal, and the polarization direction of the polarized light P is rotated by the rotation angle $\theta$.

Figure 3:
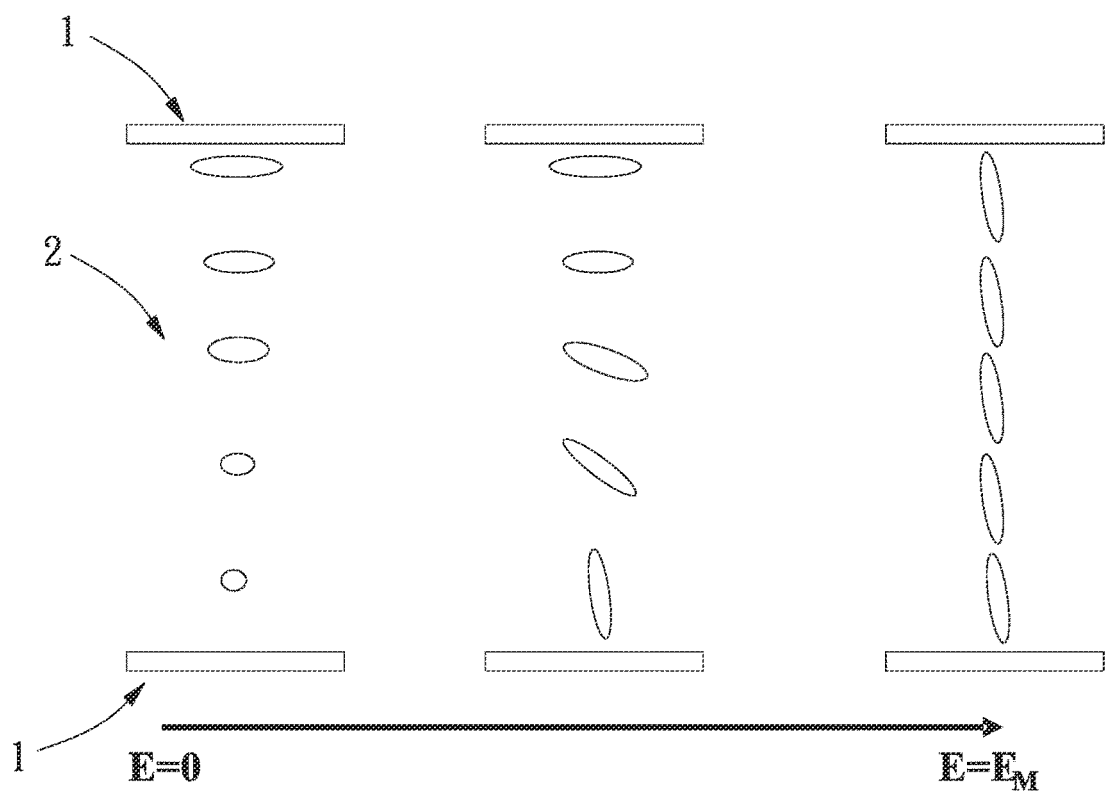
FIG. 3 is a schematic view of positive liquid crystal molecules with voltage applied in a preferred embodiment of the invention.

Referring to FIGS. 1 and 3, which show the schematic views of the electrically controlled polarization rotator of another embodiment with the switching electric field E applied to change the arrangement of liquid crystals. The rotation angle $\theta$ is greater than 0 degrees and less than or equal to 90 degrees, and the ratio of the liquid crystal thickness d to the pitch of the liquid crystal layer 2 is less than or equal to ¼. The materials of the liquid crystal layer 2 include positive liquid crystals doped with chiral molecules. When the switching electric field E is 0, the arrangement of liquid crystals is based on the alignments of the two substrates 1, so that the liquid crystal molecules are twisted on the planes parallel to the two substrates 1 and become a twisted nematic liquid crystal with the rotation angle $\theta$. At this time, the polarization direction of the polarized light P rotates by the rotation angle $\theta$. When the switching electric field E gradually increases, the liquid crystal molecules begin to be aligned along a parallel direction of the switching electric field E. The liquid crystal molecules originally aligned with the planes parallel to the two substrates 1 gradually rotate to be aligned with the planes vertical to the two substrates 1, and are twist on the planes parallel to the two substrates 1 between the two substrates 1 to become a twisted nematic liquid crystal. The stronger the switching electric field E, the smaller the twist angle of the liquid crystal molecules. At this time, the rotation angle of the polarization direction of the polarized light P becomes smaller as the switching electric field E becomes larger. When the switching electric field E increase to reach the saturated electric field $E_M$, the liquid crystal molecules are parallel to the direction of the switching electric field E, so that the liquid crystal molecules are not twisted. At this time, the polarized light P passes through the liquid crystal layer 2, but the polarization direction of the polarized light P is unchanged.

Figure 4:
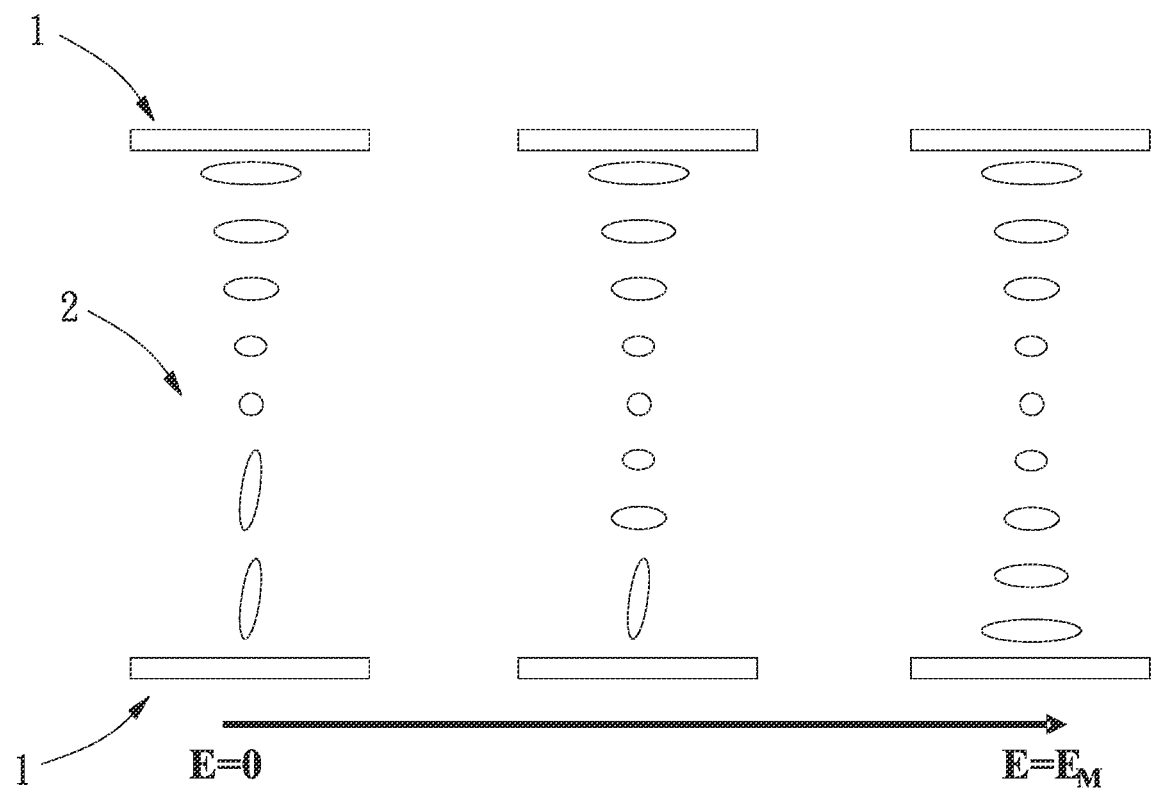
FIG. 4 a schematic view of negative liquid crystal molecules with voltage applied in another preferred embodiment of the invention.

Referring to FIGS. 1 and 4, which show the electrically controlled polarization rotator of another embodiment with the switching electric field E applied. The rotation angle $\theta$ is greater than 90 degrees and less than or equal to 180 degrees, and the ratio of the liquid crystal thickness d to the pitch of the liquid crystal layer 2 is greater than ¼ and less than or equal to ¾. In this embodiment, the materials of the liquid crystal layer 2 include negative liquid crystals doped with chiral molecules. When the switching electric field E is 0, the liquid crystal molecules arranged between the two substrates 1 gradually rotate from being aligned with the planes parallel to the two substrates 1 to being aligned with the planes vertical to the two substrates 1, equivalent to the twisted nematic liquid crystal with half the rotation angle $\theta$. At this time, the polarized light P passes through the liquid crystal layer 2, and the polarization direction of the polarized light P is rotated by half of the rotation angle $\theta$ ($\theta/2$). When the switching electric field E gradually increases, the tilt angle of the liquid crystal molecules gradually decreases from the center, so that the rotation angle $\theta$ of the polarized light P is increased, and the rotation angle $\theta$ becomes larger as the switching electric field E becomes stronger. When the switching electric field E increase to reach the saturated electric field $E_M$, the liquid crystal molecules are aligned completely perpendicular to the electric field direction and all turn to be aligned with the planes parallel to the two substrates 1, and the liquid crystal molecules are twisted into twisted nematic liquid crystals with the rotation angle $\theta$. At this time, the polarization direction of the polarized light P is rotated by the rotation angle $\theta$.

Figure 5:
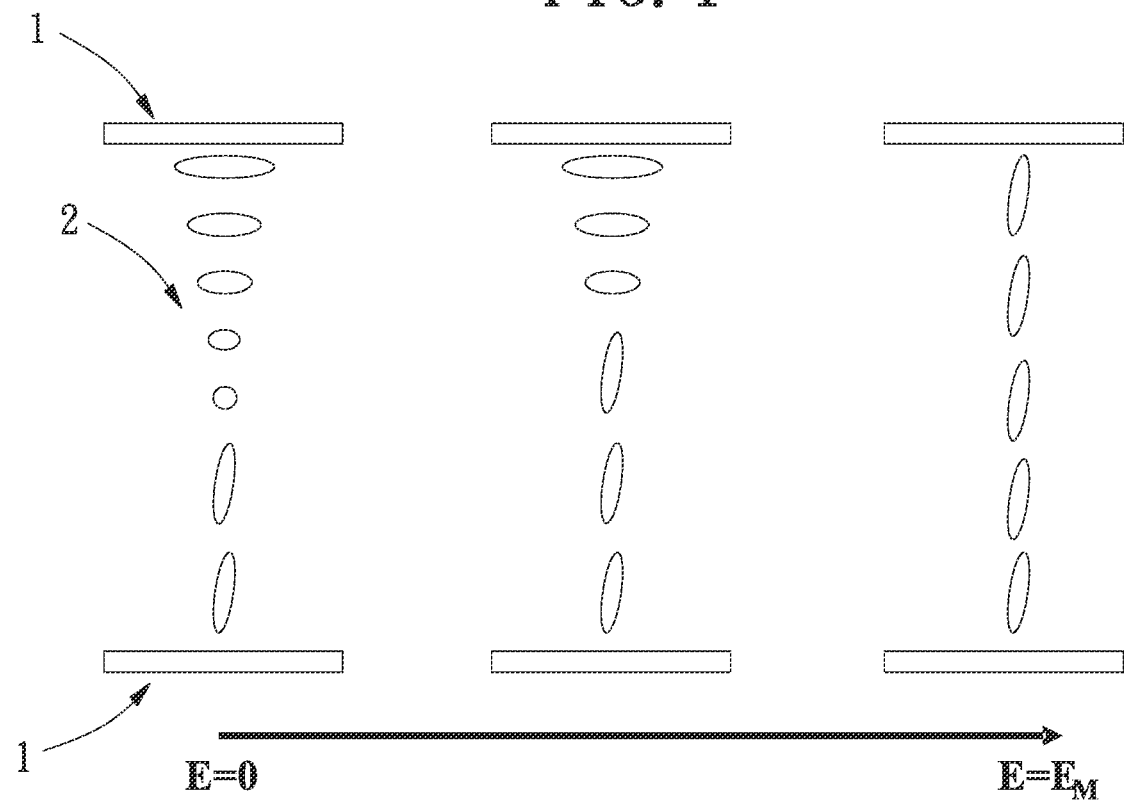
FIG. 5 is a schematic view of positive liquid crystal molecules with voltage applied in another preferred embodiment of the invention.

Referring to FIGS. 1 and 5, which show the electrically controlled polarization rotator of another embodiment with the switching electric field E applied. The rotation angle $\theta$ is greater than 90 degrees and less than or equal to 180 degrees, and the ratio of the liquid crystal thickness d to the pitch of the liquid crystal layer 2 is greater than ¼ and less than or equal to ¾. In this embodiment, the materials of the liquid crystal layer 2 include positive liquid crystals doped with chiral molecules. When the switching electric field E is 0, the polarized light P passes through the liquid crystal layer 2, and the polarization direction of the polarized light P is rotated by half of the rotation angle θ. When the switching electric field E gradually increases, the tilt angle of the liquid crystal molecules gradually increases from the center, so that the rotation angle θ of the polarized light P is decreased, and the rotation angle θ becomes smaller as the switching electric field E becomes stronger. When the switching electric field E increase to reach the saturated electric field $E_M$, the liquid crystal molecules are aligned completely parallel to the electric field direction and all turn to be aligned with the planes vertical to the two substrates 1. At this time, the polarization direction of the polarized light P is unchanged.

Figure 6:
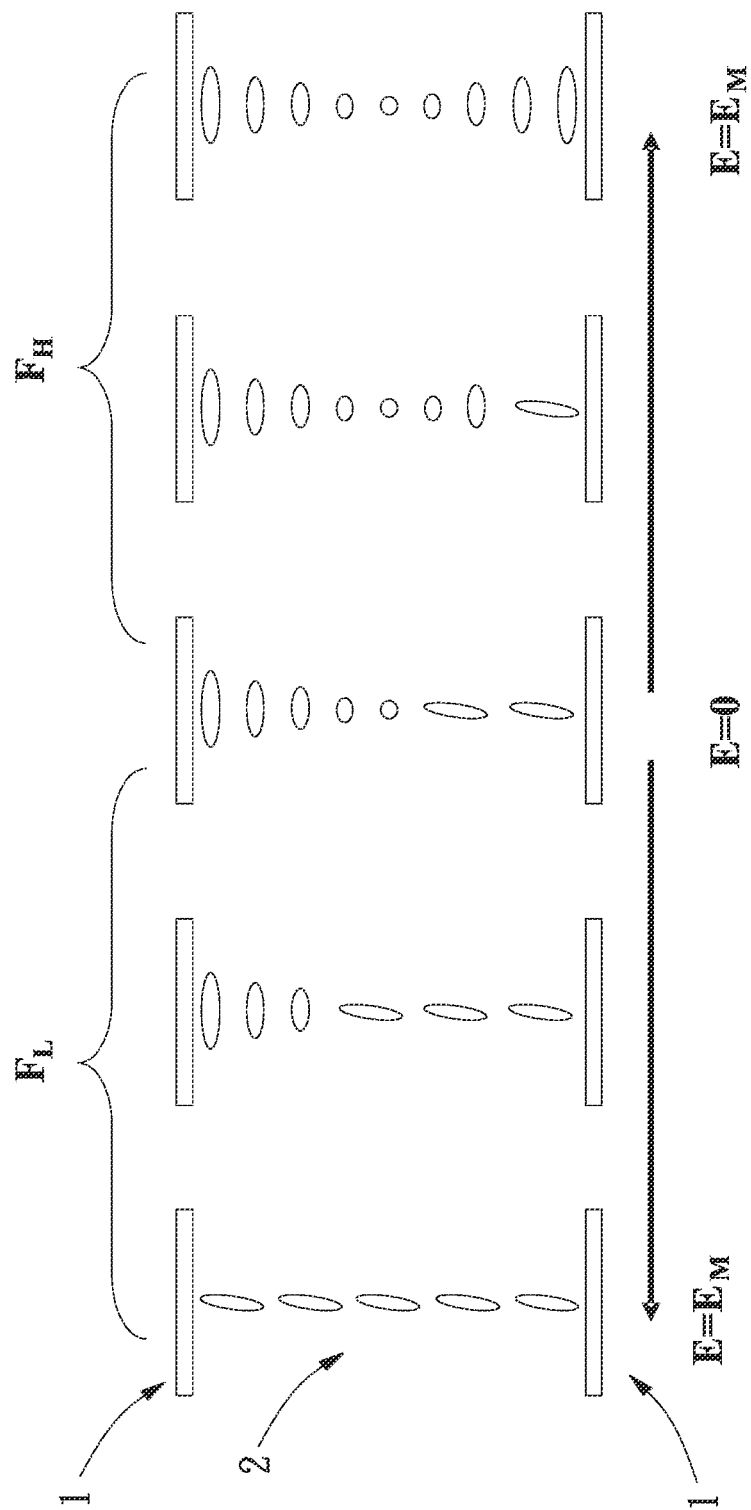
FIG. 6 is a schematic view of dual-frequency liquid crystal molecules with voltage applied in another preferred embodiment of the invention.

Referring to FIGS. 1 and 6, the rotation angle θ is greater than 90 degrees and less than or equal to 180 degrees, and the ratio of the liquid crystal thickness d to the pitch of the liquid crystal layer 2 is greater than ¼ and less than or equal to ¾. In an example, the materials of the liquid crystal layer 2 include dual-frequency liquid crystals doped with chiral molecules. A frequency of the switching electric field E switches between a low frequency $F_L$ and a high frequency $F_H$. The low frequency $F_L$ is less than a cross over frequency of the liquid crystal layer 2, and the high frequency $F_H$ is greater than the cross over frequency of the liquid crystal layer 2. As the switching electric field E switches to the low frequency $F_L$ and increases from 0 to the saturated electric field $E_M$, the rotation angle θ of the polarized light P gradually decreases. Thus, the polarization direction of the polarized light P is rotated from half of the rotation angle θ (θ/2) to 0 degrees. As the switching electric field E switches to the high frequency $F_H$ and increases from 0 to the saturated electric field $E_M$, the rotation angle θ of the polarized light P gradually increases. Thus, the polarization direction of the polarized light P is rotated from half of the rotation angle θ (θ/2) to the rotation angle θ.

Referring to FIGS. 1 and 6, the polarization rotation on the polarized light P of different wavelengths λ is performed by selecting the distance between the two substrates 1 to adjust the liquid crystal thickness d, and preparing the material composition of the liquid crystal layer 2 to adjust the birefringence Δn, so that the calculated value of Δn·d/κ corresponding to each wavelengths λ can be maintained above 10. For example, the birefringence Δn of the liquid crystal material made of the negative liquid crystals HNG726200-100 (HCCH) doped with chiral molecules R811 (HCCH) is 0.256. The liquid crystal thickness d requires at least 15.625 mm for polarization rotation acting on blue light with 400 nm wavelengths. The liquid crystal thickness d requires at least 31.25 mm for polarization rotation acting on red light with 800 nm wavelengths. Therefore, under the condition that the value of the birefringence Δn is limited by the material selection, as the maximum wavelength value of the polarized light P for polarization rotation becomes larger, the liquid crystal thickness d must be increased. However, the increase in the distance between the two substrates 1 results in the reduction of the switching electric field E, which becomes insufficient to reach the saturated electric field $E_M$. Thus, it is required to provide a higher voltage by the adjustable power supply S.

Figure 7:
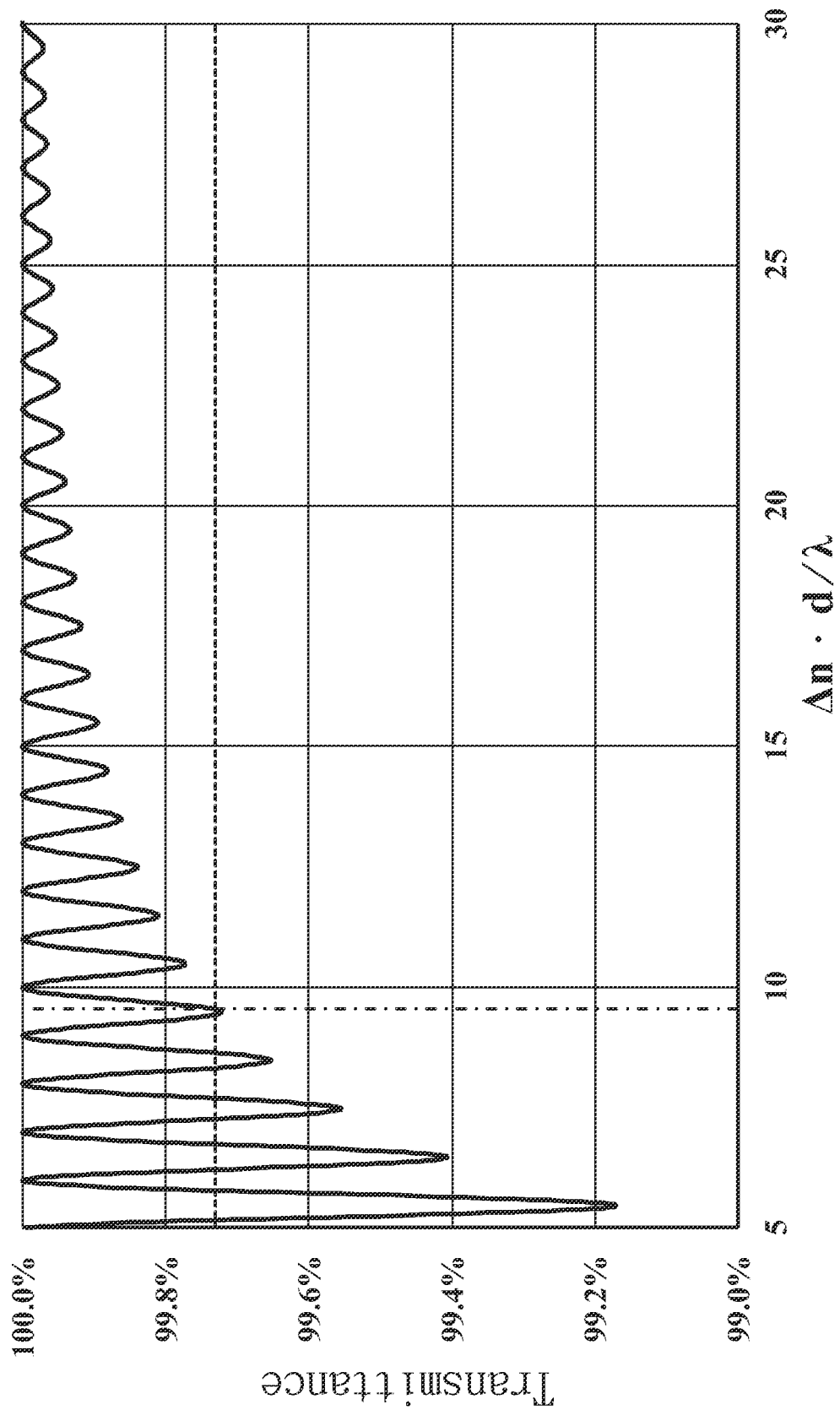
FIG. 7 is a diagram showing the relationship between the transmittance and the $\Delta n \cdot d / \lambda$ value in a 90-degree twisted state between two orthogonal polarizers (substrates) in a preferred embodiment of the invention.

Referring to FIG. 7, which shows the transmittance oscillating changes of the electrically controlled polarization rotator according to an embodiment in a 90-degree twisted state between two orthogonal polarizers (substrates). Referring to FIG. 1 again, the changes of the Δn·d/λ, values are calculated based on the specification of the liquid crystal layer 2 and the wavelength k of the polarized light P, and the changes of the Δn·d/λ, values correspond to different polarization rotation states, resulting in transmittance oscillating changes. The transmittance of 99.7% or more can be realized when the polarization rotation effect error of the liquid crystal layer 2 is within 3 degrees. As shown by the transmittance oscillating trend in FIG. 6, the transmittance can be controlled above 99.7% by the making Δn·d/λ>10. That is, the error range of the polarization rotation with the switching electric field E applied is within plus or minus 3 degrees, and the rotation angle changes of the polarization directions in that error range could not be recognized by naked eyes. Therefore, the dispersion phenomenon of the polarized light P after the polarization rotation is not observed.

In summary, the electrically controlled polarization rotator according to the invention utilizes an alignment force and the switching electric field applied to the liquid crystal layer, so as to rotate the polarization direction of the polarized light corresponding to the change of the intensity of the switching electric field, instead of utilizing volume-consuming mechanical control. In addition, selection of the thickness and chiral force of the liquid crystal layer can achieve approximate polarization rotation effects for light of given wide wavelength range, ensuring the effects of miniaturization, avoiding chromatic dispersion, and improving optical effective utilization.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. An electrically controlled polarization rotator, comprising:
two substrates having a homogeneous alignment and a homeotropic alignment respectively, with a distance between the two substrates being a liquid crystal thickness, wherein a switching electric field which is adjustable is provided between the two substrates, wherein a polarized light is incident on the substrate having the homogeneous alignment, and wherein a polarization direction of the polarized light is orthogonal or parallel to an alignment direction of the substrate having the homogeneous alignment; and
a liquid crystal layer located between the two substrates, wherein a birefringence of the liquid crystal layer multiplied by the liquid crystal thickness and further divided by a wavelength of the polarized light is greater than 10, and wherein the polarization direction of the polarized light is rotated corresponding to an intensity of the switching electric field in the liquid crystal layer;
wherein an angle between two alignment directions of the two substrates is a rotation angle;
wherein by specific relationships on the rotation angle and between the liquid crystal thickness and a pitch of the liquid crystal layer, the electrically controlled polarization rotator comprises a first configuration or a second configuration:
in the first configuration, the rotation angle is greater than 0 degrees and less than or equal to 90 degrees, wherein a ratio of the liquid crystal thickness to a pitch of the liquid crystal layer is less than or equal to ¼, and wherein the polarization direction of the polarized light is rotated between 0 degrees to the rotation angle;

in the second configuration, the rotation angle is greater than 90 degrees and less than or equal to 180 degrees, wherein a ratio of the liquid crystal thickness to a pitch of the liquid crystal layer is greater than ¼ and less than or equal to ¾, and wherein the polarization direction of the polarized light is rotated from half of the rotation angle to the rotation angle or is rotated from half of the rotation angle to 0 degrees.

2. The electrically controlled polarization rotator as claimed in claim 1, wherein in the first configuration, materials of the liquid crystal layer are negative liquid crystals doped with chiral molecules, and wherein as the switching electric field increases from 0 to a saturated electric field, the polarization direction of the polarized light is rotated from 0 degrees to the rotation angle.

3. The electrically controlled polarization rotator as claimed in claim 1, wherein in the first configuration, materials of the liquid crystal layer are positive liquid crystals doped with chiral molecules, and wherein as the switching electric field increases from 0 to a saturated electric field, the polarization direction of the polarized light is rotated from the rotation angle to 0 degrees.

4. The electrically controlled polarization rotator as claimed in claim 1, wherein in the second configuration, materials of the liquid crystal layer are negative liquid crystals doped with chiral molecules, and wherein as the switching electric field increases from 0 to a saturated electric field, the polarization direction of the polarized light is rotated from half of the rotation angle to the rotation angle.

5. The electrically controlled polarization rotator as claimed in claim 1, wherein in the second configuration, materials of the liquid crystal layer are positive liquid crystals doped with chiral molecules, and wherein as the switching electric field increases from 0 to a saturated electric field, the polarization direction of the polarized light is rotated from half of the rotation angle to 0 degrees.

6. The electrically controlled polarization rotator as claimed in claim 1, wherein in the second configuration, materials of the liquid crystal layer are dual-frequency liquid crystals doped with chiral molecules, a frequency of the switching electric field switches between a low frequency and a high frequency, with the low frequency less than a crossover frequency of the liquid crystal layer, and the high frequency greater than the crossover frequency of the liquid crystal layer, wherein as the switching electric field switches to the low frequency and increases from 0 to a saturated electric field, the polarization direction of the polarized light is rotated from half of the rotation angle to 0 degrees, and wherein as the switching electric field switches to the high frequency and increases from 0 to the saturated electric field, the polarization direction of the polarized light is rotated from half of the rotation angle to the rotation angle.

7. The electrically controlled polarization rotator as claimed in claim 1, wherein each of the two substrates has a conductive layer, wherein an adjustable power supply is electrically connected to the two conductive layers, and wherein a material of the two conductive layers is indium tin oxide, nano silver wire or nano metal particle.

8. The electrically controlled polarization rotator as claimed in claim 1, wherein a material of the two substrates is glass, acrylic or plastic.

\* \* \* \* \*